(12) United States Patent
Park et al.

(10) Patent No.: US 10,036,919 B2
(45) Date of Patent: Jul. 31, 2018

(54) MONOLITHIC DIFFUSER PLATE, AND BACKLIGHT UNIT AND LIQUID CRYSTAL DISPLAY DEVICE USING THE SAME

(71) Applicant: LG DISPLAY CO., LTD., Seoul (KR)

(72) Inventors: Kiduck Park, Paju-si (KR); Jongwan Park, Goyang-si (KR); Donghyun Chung, Seoul (KR); Junsoo Park, Gunpo-si (KR)

(73) Assignee: LG DISPLAY CO., LTD., Seoul (KR)

(*) Notice: Subject to any disclaimer, the term of this patent is extended or adjusted under 35 U.S.C. 154(b) by 0 days.

(21) Appl. No.: 15/712,565

(22) Filed: Sep. 22, 2017

(65) Prior Publication Data
US 2018/0120641 A1   May 3, 2018

(30) Foreign Application Priority Data
Oct. 28, 2016  (KR) .................. 10-2016-0141653

(51) Int. Cl.
*G02F 1/1335* (2006.01)
*G02F 1/1333* (2006.01)

(52) U.S. Cl.
CPC .. *G02F 1/133606* (2013.01); *G02F 1/133504* (2013.01); *G02F 1/133536* (2013.01); *G02F 1/133553* (2013.01); *G02F 1/133603* (2013.01); *G02F 2001/133331* (2013.01)

(58) Field of Classification Search
CPC ................................................ G02F 1/133606
See application file for complete search history.

(56) References Cited

FOREIGN PATENT DOCUMENTS

| KR | 10-2011-0039807 A | 4/2011 |
|---|---|---|
| KR | 10-2013-0044546 A | 5/2013 |

*Primary Examiner* — Joseph L Williams
(74) *Attorney, Agent, or Firm* — Birch, Stewart, Kolasch & Birch, LLP

(57) ABSTRACT

A monolithic diffuser plate for a backlight unit or a liquid crystal display (LCD) device can include a base substrate made of transparent glass, a monolithic diffusion sheet part integrated on a front surface of the base substrate, and a hiding diffusion part integrated on a rear surface of the base substrate for increasing a hiding power of the base substrate. The monolithic diffuser plate can increase a hiding power for hiding individual light sources in a backlight unit, prevent deformations caused by temperature variations and surrounding environmental factors, and minimize the thickness of a product using the monolithic diffuser plate while also increasing the reliability the product.

20 Claims, 5 Drawing Sheets

MONOLITHIC DIFFUSER PLATE, AND BACKLIGHT UNIT AND LIQUID CRYSTAL DISPLAY DEVICE USING THE SAME

CROSS-REFERENCE TO RELATED APPLICATIONS

This application claims the priority of Korean Patent Application No. 10-2016-0141653 filed in the Republic of Korea on Oct. 28, 2016, the disclosure of which is hereby incorporated by reference in its entirety.

BACKGROUND OF THE INVENTION

Technical Field

The present disclosure relates to a monolithic diffuser plate used in a backlight unit and a liquid crystal display (LCD) device, and a monolithic diffuser plate which is capable of further increasing a hiding effect while preventing a deformation caused by a variation in temperature or surrounding environment, thereby minimizing the thickness of products and improving the reliability of the products, and a backlight unit and LCD device using the same.

Related Art

An LCD device refers to a device that converts a specific molecular arrangement of liquid crystal into a different molecular arrangement by applying a voltage to the specific molecular arrangement, and converts a change in optical characteristic of a liquid crystal cell emitting light through the molecular arrangement conversion into a visual change, thereby displaying an image. The optical characteristic may include double refraction, optical activity, dichroism and light scattering.

Since the LCD device is a passive optical element that cannot emit light by itself, the LCD device displays an image using a backlight unit attached on the rear surface of a liquid crystal panel. In such an LCD device, the role and function of the backlight unit are considered to be a more and more important issue. This is because the structure of the backlight unit may significantly change the size and optical efficiency of the LCD device, and have an influence on the mechanical and optical characteristics of the LCD device.

Recently, in order to secure the competitiveness of products, a variety of backlight units have been developed. In particular, the backlights are required to have a small size and weight, because LCD devices are mainly used in portable display devices such as a notebook computer. In order to increase an image display screen with the reduction in size and weight of the backlight unit, a narrow bezel for minimizing the size of a bezel or a zero bezel for removing a bezel is applied.

However, the reduction in size and weight of the backlight unit has degraded the durability and reliability of optical components thereof. Specifically, the backlight unit includes a diffuser plate for diffusing light emitted from a plurality of light sources and a plurality of optical films mounted on the diffuser plate to uniformly emit light from the diffuser plate. The diffuser plate and the optical films can be deformed by heat, humidity and the weights thereof.

In particular, the diffuser plate is made of acrylic resin such as PMMA (Poly-Methyl-Metacryl Acrylate), which has a favorable diffusion property. Since the acrylic resin is flexible, a deflection may be caused by the weight of the acrylic resin. In this instance, the distances between the diffuser plate and the light sources may become uneven, and the diffuser plate may be deformed by heat or melted.

The deflection of the diffuser plate by gravity or the deformation of the diffuser plate by heat or moisture may cause light to be unevenly incident on the liquid crystal panel, and form irregular stains on the screen, thereby degrading the quality of the LCD device.

SUMMARY OF THE INVENTION

Various embodiments are directed to a monolithic diffuser plate which is capable of preventing a deformation caused by a variation in temperature and surrounding environment through a diffuser plate and a plurality of optical sheets integrated with each other and a base substrate formed of a transparent glass substrate, and a backlight unit and LCD device using the same.

Also, various embodiments are directed to a monolithic diffuser plate which is capable of improving a hiding power and optical efficiency by applying a transparent glass substrate as a base substrate of the monolithic diffuser plate, thereby increasing the reliability of products while minimizing the thickness of the products, and a backlight unit and LCD device using the same. For example, hiding power refers to the ability to "hide" the individual light sources from view on the viewing side of the backlight unit (e.g., to uniformly distribute the light from the light sources).

In an embodiment, a monolithic diffuser plate can include: a base substrate made of transparent glass; a monolithic diffusion sheet part integrated on a front surface of the base substrate; and a hiding diffusion part integrated on a rear surface of the base substrate that increases a hiding power of the base substrate.

In another embodiment, a backlight unit can include: a reflecting plate disposed on an inner front surface of a bottom cover; a plurality of light emitting modules disposed on a front surface of the reflecting plate and housed in the bottom cover; and the monolithic diffuser plate disposed on front surfaces of the plurality of light emitting modules and housed in the bottom cover.

In another embodiment, there is provided an LCD device which includes a liquid crystal panel defining a plurality of pixel regions to display an image and a backlight unit to irradiate light onto the liquid crystal panel. The backlight unit can include: a reflecting plate disposed on an inner front surface of a bottom cover; a plurality of light emitting modules disposed on a front surface of the reflecting plate and housed in the bottom cover; and the monolithic diffuser plate disposed on front surfaces of the plurality of light emitting modules and housed in the bottom cover.

DETAILED DESCRIPTION OF THE EMBODIMENTS

Various embodiments of the present invention will be described in detail with reference to the accompanying drawings so the technical idea of the present invention may easily be carried out by a person with ordinary skill in the art to which the invention pertains. Moreover, detailed descriptions related to well-known functions or configurations will be ruled out in order not to unnecessarily obscure subject matters of the present invention.

Hereafter, a monolithic diffuser plate according to an embodiment of the present invention and a backlight unit and LCD device using the same will be described with reference to the accompanying drawings.

Figure 1:
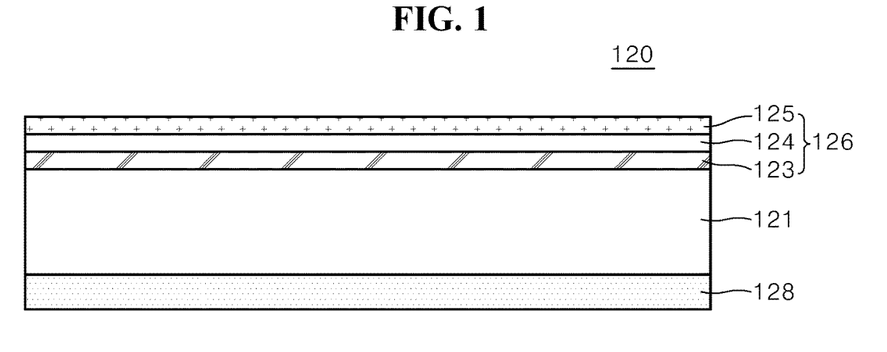
FIG. 1 is a cross-sectional view of a monolithic diffuser plate according to an embodiment of the present invention.
Figure 2:
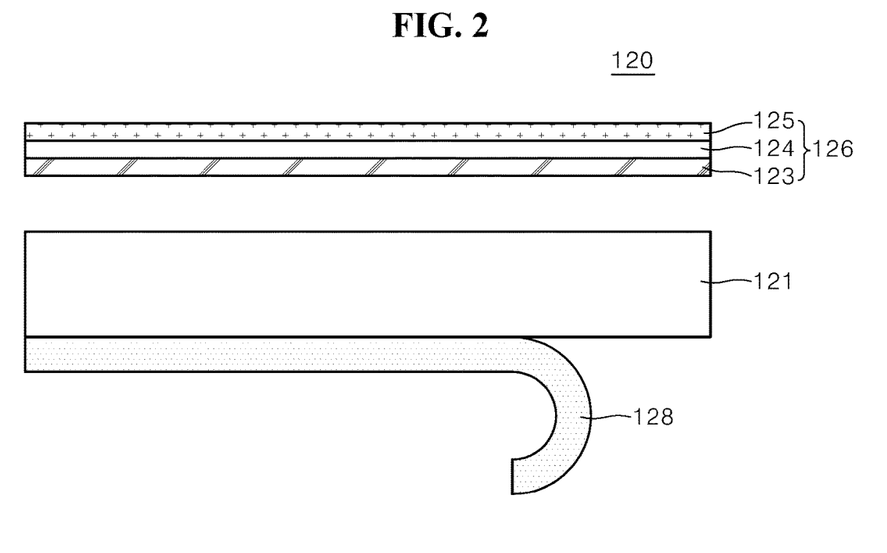
FIG. 2 is a cross-sectional view illustrating components of the monolithic diffuser plate of FIG. 1 based on a fabrication method according to an embodiment of the present invention.

FIG. 1 is a cross-sectional view of a monolithic diffuser plate according to a first embodiment of the present invention. FIG. 2 is a cross-sectional view illustrating components of the monolithic diffuser plate of FIG. 1, depending on a fabrication method.

The diffuser plate 120 illustrated in FIGS. 1 and 2 includes a base substrate 121 made of transparent glass, a diffusion sheet part 126 disposed on the front surface of the base substrate 121, and a hiding diffusion part 128 disposed on the rear surface of the base substrate 121.

The base substrate 121 can include a transparent low-iron unreinforced glass substrate. When the base substrate 121 is made of transparent unreinforced glass, the base substrate 121 can be more resistant to heat and water than plastics or acrylic resin such as PMMA. Furthermore, although the base substrate 121 is exposed to visual light or ultraviolet light for a long time, the base substrate 121 is not easily changed or warped. Therefore, the lifetime of the base substrate 121 can be extended. In addition, since the transparent unreinforced glass has higher strength or tolerance than acrylic resin or plastics, the base substrate 121 can be formed with a smaller thickness than the acrylic resin or plastics, for example, a thickness of 1 mm or less. Therefore, the base substrate 121 can be more efficiently used for narrow bezel or zero bezel-type products.

Referring to FIG. 2, the diffusion sheet part 126 is formed through a laminated molding process based on a roll-to-roll process, and has a one-sheet type or monolithic structure. The diffusion sheet part 126 is integrated on the front surface of the base substrate 121 through a roll-to-glass process.

As described above, when the diffusion sheet part 126 is fabricated separately from the base substrate 121 and mounted or laminated on the front surface of the base substrate 121, the diffusion sheet part 126 can be deformed by heat or humidity. Therefore, when the diffusion sheet part 126 is first formed as a monolithic structure and then laminated on the base substrate 121 resistant to heat or humidity, the durability of the diffusion sheet part 126 as well as the base substrate 121 can be improved. The diffusion sheet part 126 will be described later in more detail with reference to the accompanying drawings.

The hiding diffusion part 128 can be screen-printed on the rear surface of the base substrate 121 so as to be integrated with the base substrate 121. The hiding diffusion part 128 can be made of titanium dioxide or silicon dioxide ($TiO_2$/$SiO_2$), or a compound thereof.

When the base substrate 121 is made of transparent unreinforced glass, the strength of the base substrate 121 is improved, but the transparency of the base substrate 121 is increased. Thus, hiding power for hiding a plurality of light sources arranged on the rear surface thereof is inevitably degraded. When the hiding power for the light sources is reduced, a brightness difference occurs on a light emitting surface based on the positions of the light sources. Therefore, the monolithic diffuser plate 120 should have a sufficient hiding power. In particular, as the hiding power of the monolithic diffuser plate 120 is increased, the distance between the light sources and the monolithic diffuser plate 120 can be reduced, which makes it possible to reduce the thickness of the diffuser plate 120. Furthermore, when the hiding diffusion part 128 is formed on the rear surface of the base substrate 121 (e.g., closer to the light sources), the hiding diffusion part 128 can not only further increase the optical diffusion efficiency, but also prevent a damage of the base substrate 121 (e.g., protect the glass from cracking or scratching), thereby improving the durability of the diffuser plate 120.

Figure 3:
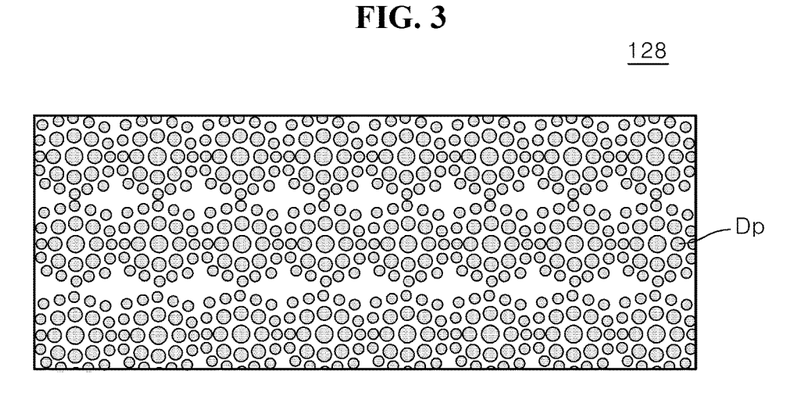
FIG. 3 is a pattern view illustrating a diffusion pattern shape of a hiding diffusion part illustrated in FIGS. 1 and 2 according to an embodiment of the present invention.

FIG. 3 is a pattern view illustrating a diffusion pattern shape of the hiding diffusion part illustrated in FIGS. 1 and 2.

Referring to FIG. 3, the hiding diffusion part 128 can be formed by screen-printing ink onto the rear surface of the base substrate 121, the ink containing a base solvent, such as $SiO_2$, $TiO_2$ and the like. When the light sources of the backlight unit are implemented as an LED package, light emitted from the light sources has a high intensity. Thus, when the hiding power is increased while the light from the light sources is blocked to some extent by the hiding diffusion part 128, an occurrence of lattice-type defects can be prevented. At this time, $SiO_2$ scatters the light emitted from the light sources 101. Thus, when $SiO_2$ is contained in the ink, the hiding diffusion part 128 can diffuse the light emitted from the light sources.

The hiding diffusion part 128 can include a plurality of diffusion patterns Dp having different sizes. The diffusion patterns Dp can be formed on the bottom surface of the hiding diffusion part 128 during a screen printing process using screen roll patterns.

FIG. 3 illustrates that the plurality of diffusion patterns Dp are formed as a plurality of circles. Also, the plurality of circles can have different sizes. However, the present embodiment is not limited thereto, but the plurality of diffusion patterns Dp can include various patterns such as elliptical patterns, polygonal patterns and hologram patterns, which can also have varying sizes.

Each of the diffusion patterns Dp can have a larger width than each of the light sources (e.g., each circle can be larger than each individual LED in a backlight unit). For example, the x-axis width of the diffusion pattern Dp can be larger than that of the light source, and the z-axis width of the diffusion pattern Dp can be larger than that of the light source. In particular, a pattern formed in the center of the diffusion pattern Dp can have a larger size than a pattern formed at the edge of the diffusion pattern Dp. For example, the sizes of the patterns formed in each of the diffusion patterns Dp can gradually decrease from the center toward the edge thereof. When the size of the diffusion pattern Dp is increased, the scattering effect of light may be improved. Therefore, the diffusion patterns Dp can be arranged in various sizes.

Figure 4:
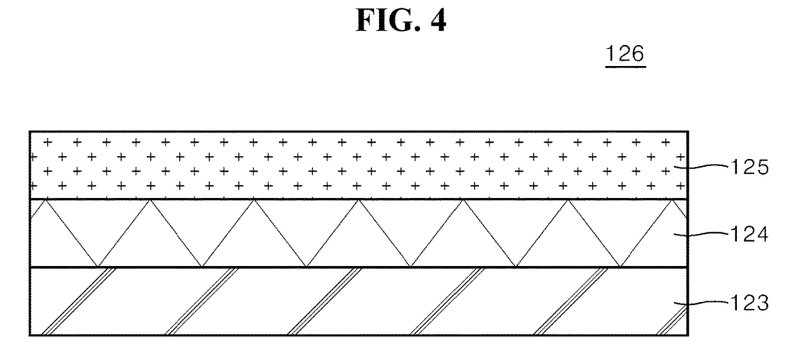
FIG. 4 is a cross-sectional view of a diffusion sheet part illustrated in FIGS. 1 and 2 according to an embodiment of the present invention.

FIG. 4 is a cross-sectional view of the diffusion sheet part illustrated in FIGS. 1 and 2.

Referring to FIG. 4, the diffusion sheet part 126 includes an optical diffusion sheet 123, a prism sheet 124 and a dispersed TRP (Toray Reflective Polarizer) sheet 125, which are laminated and integrated with the base substrate 121. The optical diffusion sheet 123 is directly bonded to the front surface of the base substrate 121 and diffuses light from the base substrate 121, the prism sheet 124 is disposed on the front surface of the optical diffusion sheet 123 and condenses the light from the optical diffusion sheet 123 into front light, and the dispersed TRP sheet is disposed on the front surface of the prism sheet 124 in order to improve the brightness of light emitted from the prism sheet 124.

The optical diffusion sheet 123 can include a binder formed of at least one of polycarbonate and poly-acrylic resin and a plurality of beads formed of at least one of PMMA, polycarbonate, polystyrene and cyclic olefin polymer. Through such a structure, the optical diffusion sheet 123 diffuses light from the base substrate 121, and provides the diffused light to the prism sheet 124.

The prism sheet 124 is disposed on the front surface of the optical diffusion sheet 123, condenses the light diffused from the optical diffusion sheet 123 on the rear surface thereof into front light by converting the emission direction of the light, and outputs the front light.

The dispersed TRP sheet 125 is disposed on the front surface of the prism sheet 124 and improves the brightness of the light emitted from the prism sheet 124, thereby improving optical efficiency.

Figure 5:
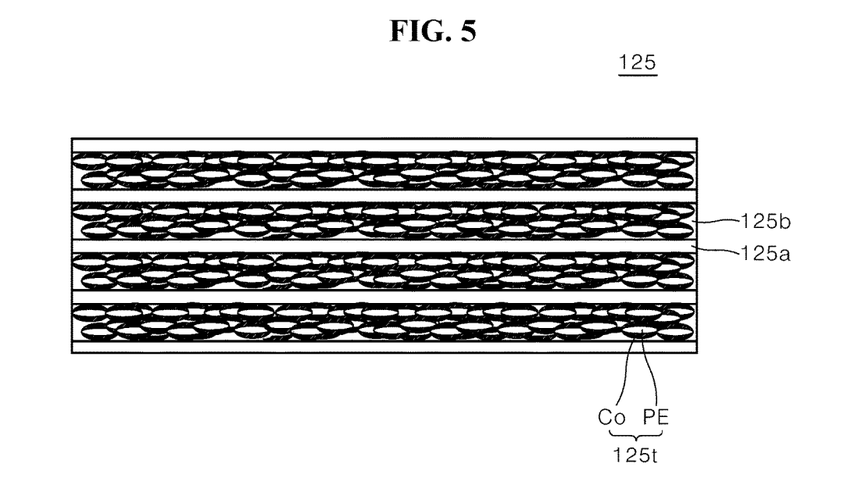
FIG. 5 is a cross-sectional view of a dispersed TRP (Toray Reflective Polarizer) sheet illustrated in FIG. 4 according to an embodiment of the present invention.

FIG. 5 is a cross-sectional view of the dispersed TRP sheet illustrated in FIG. 4.

Referring to FIG. 5, the dispersed TRP sheet 125 according to the present embodiment includes a plurality of polycarbonate layers 125a and dispersed core layers 125b, which are alternately laminated.

Since the dispersed core layer 125b includes a plurality of cores 125t which are entangled with each other according to a preset pattern, the dispersed core layer 125b exhibits high flexibility and durability. Furthermore, the polycarbonate layer 125a is solid. Therefore, the polycarbonate layers 125a and the dispersed core layers 125b can be combined into a plurality of layers, thereby improving the flexibility and durability.

The cores 125t forming the dispersed core layer 125b have a structure in which a CoPEN-based external core Co surrounds a PEN-based internal core PE, and are entangled with each other according to the preset pattern and arranged in a dispersed structure, thereby improving the half angle characteristic when light is transmitted.

As described above, the dispersed TRP sheet 125 uses the plurality of cores 125t each having a structure in which the CoPEN-based external core Co surrounds the PEN-based internal core PE. Thus, the half angle characteristic can be improved when light is transmitted, and the price can be reduced. However, the optical efficiency of the dispersed TRP sheet 125 may be slightly degraded, compared to a DBEF (Dual Brightness Enhancement Film).

Thus, in the present embodiment, the hiding diffusion part 128 can be screen-printed on the rear surface of the base substrate 121, in order to improve the diffusion efficiency. Then, the degradation in optical efficiency of the dispersed TRP sheet 125 can be recovered. Furthermore, since the hiding power for the light sources is high, the specification of the light sources can be raised to address the degradation in optical efficiency.

Figure 6:
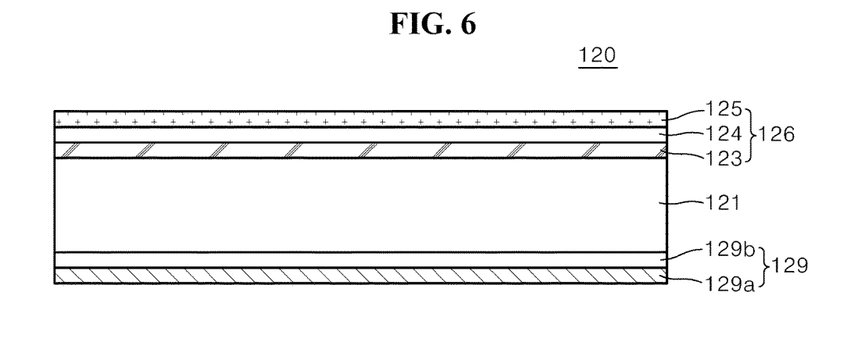
FIG. 6 is a cross-sectional view of a monolithic diffuser plate according to an embodiment of the present invention.
Figure 7:
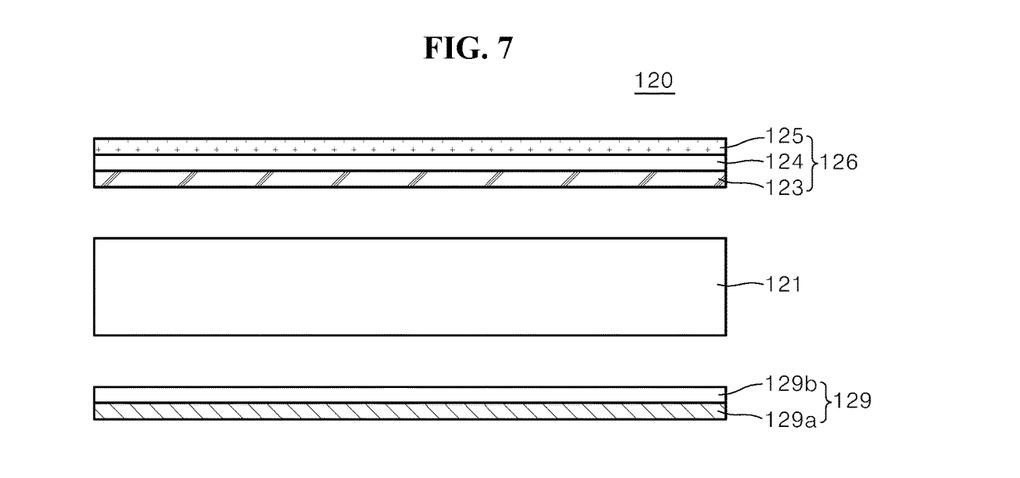
FIG. 7 is a cross-sectional view illustrating components of the monolithic diffuser plate of FIG. 6 based on a fabrication method according to an embodiment of the present invention.

FIG. 6 is a cross-sectional view of a monolithic diffuser plate according to a second embodiment of the present invention. FIG. 7 is an exploded cross-sectional view illustrating components of the monolithic diffuser plate of FIG. 6, depending on a fabrication method.

The monolithic diffuser plate 120 illustrated in FIGS. 6 and 7 has the same structure as the monolithic diffuser plate 120 illustrated in FIG. 1 except for a sheet-type hiding diffusion part 129 formed on the rear surface of the base substrate 121.

Thus, the descriptions of the structures and technical features of the base substrate 121 and the diffusion sheet part 126 will be replaced by the descriptions of those in the first embodiment and will not be repeated.

In the second embodiment, the sheet-type hiding diffusion part 129 can further increase the optical diffusion efficiency and the hiding power for hiding the light sources.

Specifically, the sheet-type hiding diffusion part 129 can be formed through a roll-to-roll process such that a plurality of air layers having the same size are formed between first and second diffusion members 129a and 129b laminated and a bead layer is formed on the rear surfaces of the first and second diffusion members 129a and 129b. Alternatively, the air layers can have different sizes. The sheet-type hiding diffusion part 129 is integrated on the rear surface of the base substrate 121 formed through a roll-to-glass process.

When the base substrate 121 is made of transparent unreinforced glass, the hiding power for hiding the plurality of light sources arranged on the rear surface thereof may be lowered. Therefore, the hiding power needs to be further increased with the hiding diffusion part 129 according to the second embodiment. In addition, the air layers and the bead layers of the sheet-type hiding diffusion part 129 can further increase the optical diffusion efficiency. When the sheet-type hiding diffusion part 129 is integrated on the rear surface of the base substrate 121, the sheet-type hiding diffusion part 129 can prevent damage to the base substrate 121 (e.g., protect and cushion the glass substrate), thereby raising the durability of the base substrate 121.

Figure 8:
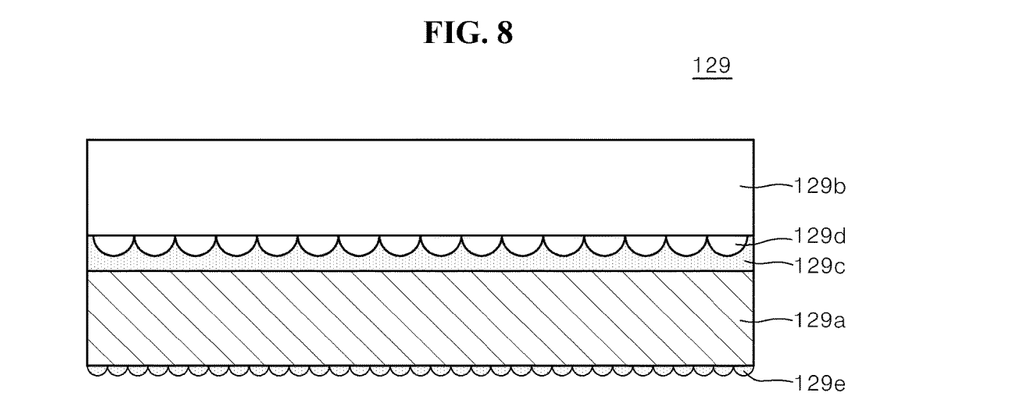
FIG. 8 is a cross-sectional view illustrating a laminated structure of a hiding diffusion part of FIG. 7 according to an embodiment of the present invention.

FIG. 8 is a cross-sectional view illustrating a laminated structure of the hiding diffusion part illustrated in FIG. 7.

The sheet-type hiding diffusion part 129 illustrated in FIG. 8 includes a first diffusion member 129a, a bead layer 129e, an adhesive diffusion member 129c and a second diffusion member 129b, which are integrated with each other. The first diffusion member 129a diffuses light incident from the rear surface of the sheet-type hiding diffusion part 129. The bead layer 129e is disposed on the rear surface of the first diffusion member 129a and has a plurality of beads. The adhesive diffusion member 129c is disposed on the front surface of the first diffusion member 129a and has a plurality of air layer formation grooves 129d. The second diffusion member 129b is disposed on the front surface of the adhesive diffusion member 129c to cover all of the air layer formation grooves 129d, and has the front surface bonded to the rear surface of the base substrate 121.

The first and second diffusion members 129a and 129b are made of PET (Polyethylene Terephthalate), and serve to diffuse light incident from the rear surface and emit the diffused light to the front surface.

The adhesive diffusion member 129c is formed by depositing an acrylic binder on the front surface of the first diffusion member 129a, and the plurality of air layer formation grooves 129d of the acrylic binder are formed through a molding process.

Since the acrylic binder is not transparent, the acrylic binder itself has a hiding power. Furthermore, since the air layers and the air layer formation grooves 129d formed in the acrylic binder irregularly refract light, the hiding power can be further increased. The second diffusion member 129b can be laminated on the front surfaces of the air layers of the acrylic binder after the plurality of air layer formation grooves 129d are formed in the acrylic binder. Thus, the air layers of the acrylic binder can be formed between the first and second diffusion members 129a and 129b.

The bead layer 129e disposed on the rear surface of the first diffusion member 129a can be additionally formed after the first and second diffusion members 129a and 129b are laminated through the roll-to-roll process.

The sheet-type hiding diffusion part 129 can be integrated on the rear surface of the base substrate 121 while increasing the optical diffusion efficiency through the air layers and the bead layer, thereby increasing the durability of the base substrate 121.

Figure 9:
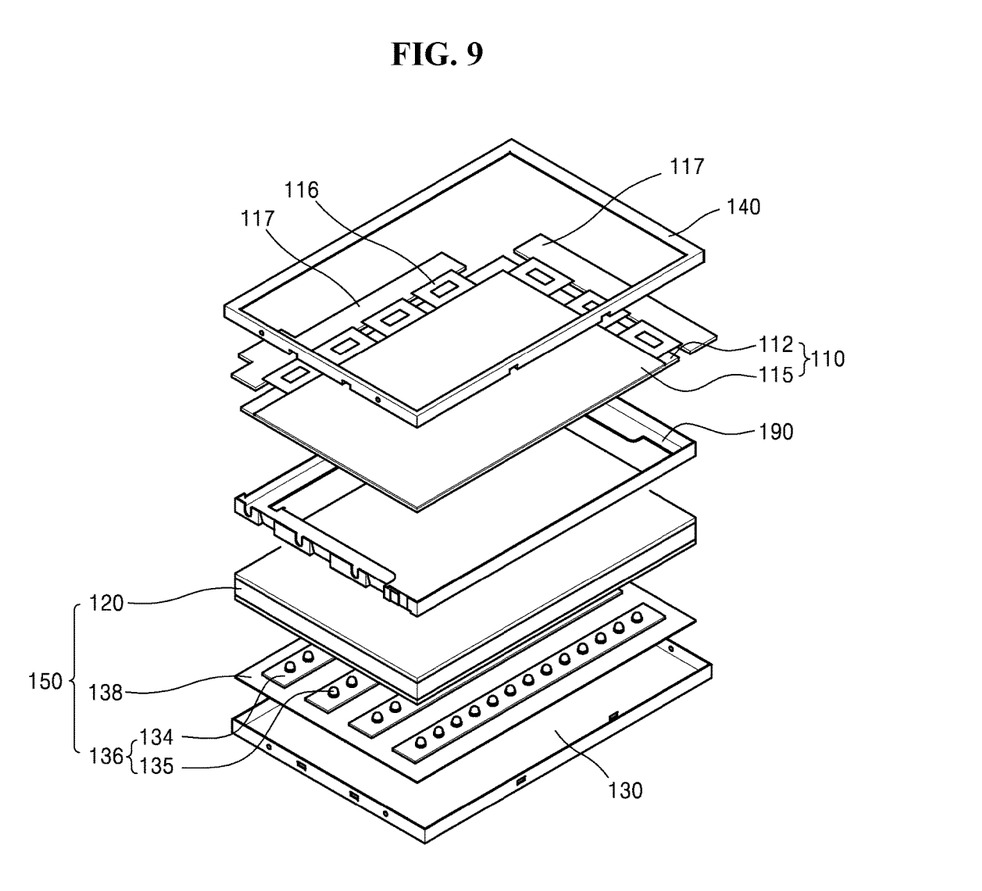
FIG. 9 is an exploded perspective view illustrating a backlight unit and LCD device to which the monolithic diffuser plates according to embodiments of the present invention are applied.

FIG. 9 is an exploded perspective view illustrating a backlight unit and LCD device to which the monolithic diffuser plates according to the first and second embodiments of the present invention are applied.

First, the configuration of the backlight unit 150 in the LCD device of FIG. 9 will be described as follows.

The backlight unit 150 of the LCD device includes a bottom cover 130, a reflecting plate 138 disposed on the internal front surface of the bottom cover 130, a plurality of light emitting modules 136 disposed on the front surface of the reflecting plate 138 and housed in the bottom cover 130, and a diffuser plate 120 disposed on the front surfaces of the plurality of light emitting modules 136 and housed in the bottom cover 130.

Four sides of the bottom surface of the bottom cover 130 are folded into a rectangular frame of which the front surface is open while the four sides thereof are wall surfaces. The reflecting plate 138, the light emitting modules 136 and the monolithic diffuser plate 120 are all housed in the bottom cover 130.

The light emitting module 136 includes one or more light sources 135 and one or more printed circuit boards 134 each having one or more light sources 135 mounted thereon and including a driving circuit for driving the one or more light sources 135.

A plurality of LEDs (Light Emitting Diodes) can be used as the respective light sources 135. The plurality of LEDs are mounted on the printed circuit board 134 while being separated a predetermined distance from each other, and irradiates light onto the rear surface of the monolithic diffuser plate 120.

In addition, a fluorescent lamp can be used instead of the light emitting module 136 using LEDs. In this instance, the backlight unit 150 may further include a lamp guide for protecting and guiding the outside of the fluorescent lamp.

The printed circuit board 134 of the light emitting module 136 can further include a driving circuit for driving the light sources 135, for example, an LED driver integrated. Light emitted from each of the light sources 135 by the LED driver integrated circuit is indirectly emitted toward the liquid crystal panel through a diffusion effect of the monolithic diffuser plate 120.

The reflecting plate 138 can be positioned on the inner bottom surface of the bottom cover 130 to correspond to the rear surface of the monolithic diffuser plate 120. The reflecting plate 138 can also be formed on the inner side surfaces of the bottom cover 130 to cover the side surfaces of the monolithic diffuser plate 120. The reflecting plate 138 can diffuse light headed for the rear surface of the monolithic diffuser plate 120 such that the light is emitted toward the front surface of the monolithic diffuser plate 120. Therefore, the brightness of the emitted light can be improved.

The monolithic diffuser plate 120 can include any one of the monolithic diffuser plates 120 according to the embodiments illustrated in FIGS. 1 to 8.

Since the monolithic diffuser plate 120 according to the present embodiment includes the dispersed TRP sheet 125, the half angle characteristic during light transmission can be improved, while the price thereof is reduced. However, the optical efficiency of the monolithic diffuser plate 120 may be slightly degraded in comparison to the DBEF which has been used in the related art.

Thus, in the present embodiment, the sheet-type hiding diffusion part 129 is integrated on the rear surface of the base substrate 121. The sheet-type hiding diffusion part 129 can improve the diffusion efficiency to partially recover the degradation in optical efficiency of the dispersed TRP sheet 125. Furthermore, since the hiding power for the light sources is high, the specification of the light sources can be raised to partially recover the degradation in optical efficiency.

Referring to FIG. 9, an LCD device to which the backlight unit according to the present embodiment is applied will be described.

The LCD device illustrated in FIG. 9 can include a liquid crystal panel 110 defining a plurality of pixel regions to display an image, a backlight unit 150 irradiating light onto the liquid crystal panel 110, and a support main 190 for modularizing the liquid crystal panel 110 and the backlight unit 150. The LCD device can further include a bezel 140 for covering and protecting the front edges and side surfaces of the liquid crystal panel 110 and the support main 190.

The liquid crystal panel 110 plays a key role in expressing an image, and includes first and second substrates 112 and 115 bonded to each other with a liquid crystal layer interposed therebetween. Also, the first substrate 112 which is typically referred to as a bottom substrate or array substrate under the supposition that the LCD device is an active matrix LCD device includes pixel regions defined at the respective intersections between a plurality of gate lines and data lines, and thin film transistor (TFT) are installed at the intersections to correspond one-to-one to transparent pixel electrodes formed in the respective pixel regions.

Furthermore, the second substrate 115 referred to as a top substrate or color substrate includes red (R), green (G) and blue (B) color filters corresponding to the respective pixels, a black matrix surrounding the color filters and covering non-display elements such as the gate lines, the data line and the thin film transistors, and a transparent common element covering the color filters and the black matrix. The transparent common element can be formed in the first substrate 112. Each of the first and second substrates 112 and 115 has a polarizing plate attached to the outer surface thereof, the polarizing plate serving to selectively transmit only specific light.

Furthermore, a printed circuit board 117 can be connected to one or more edges of the liquid crystal panel 110 through a connection member 116 such as a flexible circuit board or tape carrier package (TCP), and properly folded and contacted with the side surface of the support main 190 or the rear surface of the bottom cover 130 during a modularizing process.

The backlight unit 150 that supplies light to display a difference of transmittance as an image is installed on the rear surface of the liquid crystal panel 110. The liquid crystal panel 110 and the backlight unit 150 are modularized through a bezel 140, the support main 190 and the bottom cover 130.

More specifically, the edges of the liquid crystal panel 110 and the backlight unit 150 are surrounded by the support main 190 having a rectangular frame shape, and the liquid crystal panel 110 and the backlight unit 150 are coupled to the bezel 140 surrounding the top edges of the liquid crystal panel 110 and the bottom cover 130 covering the rear surface of the backlight unit 150, and integrated and modularized through the support main 190.

Through the modularization, light emitted from the plurality of light sources 135 of the backlight unit 150 is incident on the rear surface of the monolithic diffuser plate 120 and then condensed toward the liquid crystal panel 110. At this time, while passing through the monolithic diffuser plate 120 with light reflected by the reflecting plate 138, the light is processed into a more uniform high-quality surface light source and supplied to the liquid crystal panel 110. The monolithic diffuser plate 120 according to the present embodiment can include the monolithic diffuser plates 120 according to the embodiments illustrated in FIGS. 1 to 8.

In the monolithic diffuser plate 120, and the backlight unit 150 and the LCD device including the same according to the embodiments of the present invention, the base substrate of the monolithic diffuser plate 120 can be formed of a transparent glass substrate, in order to prevent a deformation caused by a variation in temperature and surrounding environment.

Furthermore, since a transparent glass substrate is applied as the base substrate of the monolithic diffuser plate 120, the hiding power can be additionally improved, and the optical efficiency can be improved. Therefore, it is possible to increase the reliability of products while minimizing the thickness of the products.

According to the embodiments of the present invention, the diffuser plate and the plurality of optical sheets are integrated with each other and the base substrate of the monolithic diffuser plate is formed of a transparent glass substrate. Thus, the monolithic diffuser plate and the backlight unit and LCD device using the same can prevent a deformation caused by a variation in temperature and surrounding environment.

Furthermore, as a transparent glass substrate is applied as the base substrate of the monolithic diffuser plate, the hiding power can be additionally improved, and the optical efficiency can be improved. Thus, the reliability of products can be improved while the thickness of the products is minimized.

While various embodiments have been described above, it will be understood to those skilled in the art that the embodiments described are by way of example only. Accordingly, the disclosure described herein should not be limited based on the described embodiments.

What is claimed is:

1. A monolithic diffuser plate comprising:
   a base substrate including transparent glass;
   a monolithic diffusion sheet part integrated on a front surface of the base substrate; and
   a hiding diffusion part integrated on a rear surface of the base substrate for increasing a hiding power of the base substrate.

2. The monolithic diffuser plate of claim 1, wherein the hiding diffusion part includes screen-printed ink on the rear surface of the base substrate, and
   wherein the screen-printed ink includes one or more of a base solvent, $SiO_2$, $TiO_2$, and a plurality of diffusion patterns having different sizes on the front or rear surface of the hiding diffusion part.

3. The monolithic diffuser plate of claim 2, wherein each of the plurality of diffusion patterns has a width larger than a width of each light source among a plurality of light sources in a backlight unit overlapping with the hiding diffusion part.

4. The monolithic diffuser plate of claim 2, wherein the plurality of diffusion patterns are arranged in a plurality of diffusion pattern groups in the hiding diffusion part, and
   wherein diffusion patterns within each of the plurality of diffusion pattern groups decrease in size from a center toward an edge of the corresponding diffusion pattern group.

5. The monolithic diffuser plate of claim 1, wherein the monolithic diffusion sheet part comprises:
   an optical diffusion sheet directly bonded to the front surface of the base substrate, and configured to diffuse light from the base substrate;
   a prism sheet disposed on the optical diffusion sheet and configured to condense light from the optical diffusion sheet into front light; and
   a dispersed TRP (Toray Reflective Polarizer) sheet disposed on the prism sheet and configured to increase brightness of the front light emitted from the prism sheet.

6. The monolithic diffuser plate of claim 5, wherein the dispersed TRP sheet includes polycarbonate layers and dispersed core layers which are alternately laminated.

7. The monolithic diffuser plate of claim 6, wherein the dispersed core layers include a plurality of cores that are entangled with each other according to a preset pattern.

8. The monolithic diffuser plate of claim 7, wherein the plurality of cores forming the dispersed core layer each have a structure in which a CoPEN-based external core surrounds a PEN-based internal core, and the CoPEN-based external core and the PEN-based internal core are entangled with each other to form a dispersed structure.

9. The monolithic diffuser plate of claim 1, wherein the hiding diffusion part is formed through a roll-to-roll process and includes a plurality of air layers having a same size between a first diffusion member and a second diffusion member laminated to each other, and a bead layer is disposed on a rear surface of the first diffusion member or the second diffusion member, and
   wherein the hiding diffusion part is integrated on the rear surface of the base substrate through a roll-to-glass process.

10. The monolithic diffuser plate of claim 1, wherein the hiding diffusion part comprises:
    a first diffusion member configured to diffuse light incident on a rear surface of the hiding diffusion part;
    a bead layer disposed on a rear surface of the first diffusion member and including a plurality of beads;
    an adhesive diffusion member disposed on a front surface of the first diffusion member and including a plurality of air layer formation grooves; and a second diffusion member disposed on a front surface of the adhesive diffusion member and covering all of the plurality of air layer formation grooves, and having a front surface bonded to the rear surface of the base substrate, wherein the first diffusion member, the bead layer, the adhesive diffusion member and the second diffusion member are laminated and integrated with each other.

11. A backlight unit comprising:
a reflecting plate disposed on an inner front surface of a bottom cover;
a plurality of light emitting modules disposed on a front surface of the reflecting plate and housed in the bottom cover; and
a monolithic diffuser plate disposed on front surfaces of the plurality of light emitting modules and housed in the bottom cover,
wherein the monolithic diffuser plate includes:
a base substrate including transparent glass,
a monolithic diffusion sheet part integrated on a front surface of the base substrate, and
a hiding diffusion part integrated on a rear surface of the base substrate for increasing a hiding power of the base substrate.

12. The backlight unit of claim 11, wherein the hiding diffusion part includes screen-printed ink on the rear surface of the base substrate, and
wherein the screen-printed ink includes one or more of a base solvent, $SiO_2$, $TiO_2$, and a plurality of diffusion patterns having different sizes on the front or rear surface of the hiding diffusion part.

13. The backlight unit of claim 11, wherein the monolithic diffusion sheet part comprises:
an optical diffusion sheet directly bonded to the front surface of the base substrate, and configured to diffuse light from the base substrate;
a prism sheet disposed on the optical diffusion sheet and configured to condense light from the optical diffusion sheet into front light; and
a dispersed TRP (Toray Reflective Polarizer) sheet disposed on the prism sheet and configured to increase brightness of the front light emitted from the prism sheet.

14. The backlight unit of claim 11, wherein the hiding diffusion part is formed through a roll-to-roll process and includes a plurality of air layers having a same size between a first diffusion member and a second diffusion member laminated to each other, and a bead layer is disposed on a rear surface of the first diffusion member or the second diffusion member, and
wherein the hiding diffusion part is integrated on the rear surface of the base substrate through a roll-to-glass process.

15. The backlight unit of claim 11, wherein the hiding diffusion part comprises:
a first diffusion member configured to diffuse light incident on a rear surface of the hiding diffusion part;
a bead layer disposed on a rear surface of the first diffusion member and including a plurality of beads;
an adhesive diffusion member disposed on a front surface of the first diffusion member and including a plurality of air layer formation grooves; and
a second diffusion member disposed on a front surface of the adhesive diffusion member and covering all of the plurality of air layer formation grooves, and having a front surface bonded to the rear surface of the base substrate, wherein the first diffusion member, the bead layer, the adhesive diffusion member and the second diffusion member are laminated and integrated with each other.

16. A liquid crystal display (LCD) device comprising:
a liquid crystal panel defining a plurality of pixel regions for displaying an image; and
a backlight unit configured to irradiate light onto the liquid crystal panel,
wherein the backlight unit comprises:
a reflecting plate disposed on an inner front surface of a bottom cover,
a plurality of light emitting modules disposed on a front surface of the reflecting plate and housed in the bottom cover, and
a monolithic diffuser plate disposed on front surfaces of the plurality of light emitting modules and housed in the bottom cover, and
wherein the monolithic diffuser plate includes:
a base substrate including transparent glass,
a monolithic diffusion sheet part integrated on a front surface of the base substrate, and
a hiding diffusion part integrated on a rear surface of the base substrate for increasing a hiding power of the base substrate.

17. The LCD device of claim 16, wherein the hiding diffusion part includes screen-printed ink on the rear surface of the base substrate, and
wherein the screen-printed ink includes one or more of a base solvent, $SiO_2$, $TiO_2$, and a plurality of diffusion patterns having different sizes on the front or rear surface of the hiding diffusion part.

18. The LCD device of claim 16, wherein the monolithic diffusion sheet part comprises:
an optical diffusion sheet directly bonded to the front surface of the base substrate, and configured to diffuse light from the base substrate;
a prism sheet disposed on the optical diffusion sheet and configured to condense light from the optical diffusion sheet into front light; and
a dispersed TRP (Toray Reflective Polarizer) sheet disposed on the prism sheet and configured to increase brightness of the front light emitted from the prism sheet.

19. The LCD device of claim 16, wherein the hiding diffusion part is formed through a roll-to-roll process and includes a plurality of air layers having a same size between a first diffusion member and a second diffusion member laminated to each other, and a bead layer is disposed on a rear surface of the first diffusion member or the second diffusion member, and
wherein the hiding diffusion part is integrated on the rear surface of the base substrate through a roll-to-glass process.

20. The LCD device of claim 16, wherein the hiding diffusion part comprises:
a first diffusion member configured to diffuse light incident on a rear surface of the hiding diffusion part;
a bead layer disposed on a rear surface of the first diffusion member and including a plurality of beads;
an adhesive diffusion member disposed on a front surface of the first diffusion member and including a plurality of air layer formation grooves; and
a second diffusion member disposed on a front surface of the adhesive diffusion member and covering all of the plurality of air layer formation grooves, and having a front surface bonded to the rear surface of the base substrate, wherein the first diffusion member, the bead layer, the adhesive diffusion member and the second diffusion member are laminated and integrated with each other.

* * * * *